(12) United States Patent
Mantovani

(10) Patent No.: US 12,011,980 B2
(45) Date of Patent: Jun. 18, 2024

(54) WATER COLLECTION SYSTEM FOR MONOCOQUE VEHICLES APPLIED WITH TONNEAU COVER OR SIMILAR

(71) Applicant: Keko Acessorios S/A, Caxias do Sul (BR)

(72) Inventor: Juliano Scheer Mantovani, Caxias do Sul (BR)

(73) Assignee: Keko Acessorios S/A, Caxias do Sul (BR)

( * ) Notice: Subject to any disclaimer, the term of this patent is extended or adjusted under 35 U.S.C. 154(b) by 0 days.

(21) Appl. No.: 17/272,475

(22) PCT Filed: Sep. 23, 2020

(86) PCT No.: PCT/BR2020/050377
§ 371 (c)(1),
(2) Date: Mar. 1, 2021

(87) PCT Pub. No.: WO2022/061424
PCT Pub. Date: Mar. 31, 2022

(65) Prior Publication Data
US 2023/0211654 A1    Jul. 6, 2023

(51) Int. Cl.
*B60J 7/00* (2006.01)
(52) U.S. Cl.
CPC .................. *B60J 7/0084* (2013.01)
(58) Field of Classification Search
CPC ... B60J 7/00; B60J 7/0084; B60J 7/067; B60J 7/068; B60J 7/10; B60J 10/00;
(Continued)

(56) References Cited

U.S. PATENT DOCUMENTS 4,216,990 A * 8/1980 Musgrove ................ B60J 7/041
                                                          296/213
4,832,394 A * 5/1989 Macomber ................ B60P 7/02
                                                          296/100.06
(Continued)

FOREIGN PATENT DOCUMENTS

BR   202017024571 U2 * 6/2018 .............. B60J 5/185
ES        2281250 A1 * 9/2007 .............. B60J 7/068
(Continued)

OTHER PUBLICATIONS

Montovani, "Constructive Provision Applied in the Sealing System of Maritime Cover", Published: Jun. 26, 2018, Publisher: Brazil Patent Office, Edition: BR202017024571U2 (Year: 2018).*
(Continued)

*Primary Examiner* — Lori Lyjak
(74) *Attorney, Agent, or Firm* — Pilloff Passino & Cosenza LLP; Rachel Pilloff; Sean Passino

(57) ABSTRACT

The water draining and collection system for monocoque vehicles applied with tonneau cover or similar object of present invention is aimed to solve the drawbacks described in the prior art through a water collection system for monocoque vehicles applied with tonneau cover or similar comprising a set of rails and of specific shape positioned on bed side and front faces between the plastic finishes and bedliners avoiding water intake and improving the draining system. This new embodiment applied in the water collection system allows an easy deployment and application in any bed monocoque vehicle model, efficiently solving the problem of water intake and assuring a better water draining.

5 Claims, 16 Drawing Sheets

(58) Field of Classification Search
CPC ... B60J 10/21; B60J 10/25; B60J 10/80; B60J 5/108; B60P 7/04; B60P 7/06; B60R 13/00; B60R 13/07
USPC ........... 296/213, 98, 100.03, 100.17, 136.03
See application file for complete search history.

(56) References Cited

U.S. PATENT DOCUMENTS

| | | | | |
|---|---|---|---|---|
| 6,126,226 | A * | 10/2000 | Wheatley | B60J 7/104 296/100.01 |
| 2006/0049658 | A1* | 3/2006 | Sugimoto | B60J 7/10 296/100.03 |
| 2013/0001979 | A1* | 1/2013 | Rusher | B60J 7/141 296/100.07 |
| 2018/0126833 | A1* | 5/2018 | Hannan | B60J 7/068 |

FOREIGN PATENT DOCUMENTS

| | | | | |
|---|---|---|---|---|
| GB | 2379636 | A * | 3/2003 | ............. B60R 13/01 |
| KR | 102050593 | B1 * | 12/2019 | ............. B60J 5/108 |

OTHER PUBLICATIONS

Hoon, "Dump Truck", Published: Dec. 3, 2019, Publisher: Korean Patent Office, Edition: KR102050593B1 (Year: 2019).*

Friase Jose, "Roller closing cover for transportation light vehicles, consists of light mattress of aluminum or plastic, which is enrolled in light box vehicles of load" Published: Sep. 16, 2007, Publisher Spain Patent Office, Edition: ES2281250A1 (Year: 2007).*

* cited by examiner

WATER COLLECTION SYSTEM FOR MONOCOQUE VEHICLES APPLIED WITH TONNEAU COVER OR SIMILAR

FIELD OF THE INVENTION

The present invention describes a water collection system for monocoque vehicles applied with tonneau cover, cap or similar. More specifically, it comprises a set of specific-shaped rails positioned on the side and upper front faces of the bed between the bedliner and the plastic finishes of the bed, capturing water that may eventually enter, preventing water from invading the bed and improving the draining system.

This embodiment applied in water collection system allows easy deployment and application in any model of monocoque vehicle with bed, effectively solving the water intake problem and ensuring a better draining of water that enters through the tonneau, plastic finishes and other points of body intrusion preventing this water from reaching the useful load portion of the vehicle bed.

BACKGROUND OF THE INVENTION

Light load vehicles, similar to a pickup truck, with an open cab and body (pickup trucks) are suitable for receiving a cover (tonneau), which may or may not fall backwards, completely covering the body.

The tonneau cover consists of a set of profiles generally forming a rectangle, to which it will be attached with the vehicle's bed in order to allow the tonneau to be attached.

The truck cap is comprised of rigid material cut in a shape similar to the bed perimeter and can be opened upwards through hinges placed at the front of the bed.

The undercover tonneau cover is built with interlocking cross-section profiles running on side rails attached to the vehicle, which retract by rolling up similar to a roller blind and allowing access to the inside the bed.

This embodiment is a market standard, which when mounted on the vehicle's bed needs to be arranged with a tilt from the front portion to the rear portion, in order to facilitate the water draining that normally accumulates in the front portion and on the tonneau cover, mainly in vehicles with monocoque bed.

Despite several ways of embodiment applied to the systems for fixing and sealing the tonneau covers with the monocoque beds, there is always some point of water intake, especially with the front profile, plastic finishes, vehicle chassis and also with the side profiles, causing various inconveniences to users.

Thus, the present inventor, seeking to solve this market inconvenience, has developed a set of rails equipped with a specific format, allowing its fixation with the side and front faces of bed, in order to direct out of bed the water entering through the existing sealing points or the plastic finishes of vehicle itself. It creates an internal drainage point that captures and drains incoming water, effectively solving the water intake problem.

In search performed in the prior art, we identified several documents seeking to solve the inconvenience of water intake with the tonneau covers, wherein we can highlight the following:

BR202017024571-9, from same inventor, describes a frontal profile in the radius shape consisted of a patterned profile generating a lever against the vehicle rear windscreen, in order to press the front seal against the wind and not allow the infiltration of water into vehicle bed, eliminating the need for tilted mounting and use of drains for draining water. In addition, the side and back profiles are reduced in height, which improves the attachment of the tonneau cover to vehicle body and results in a new aesthetic look.

This prior art document, from same inventor, describes an embodiment applied to front profile that seeks to solve the inconveniences of water intake with the tonneau covers applied in monocoque vehicles. However, the present inventor has developed an additional point to the sealing system existing in the prior art.

Therefore, the present inventor, seeking to solve the drawbacks of the prior art, has developed a set of rails positioned on the side and front faces of bed, in order to generate an additional point of water draining before it can migrate to the useful bed load area.

Thus, it is the object of the present invention a water collection system for monocoque vehicles applied with tonneau cover or similar comprising a set of specific-shaped rails positioned on the side and front faces of bed, between the plastic finishes and the bedliner, avoiding water intake and improving the draining system. This embodiment applied to water collection system allows easy deployment and application in any model of monocoque vehicle with bed, effectively solving the water intake problem and ensuring a better draining of water that migrates into the vehicle bed.

OBJECTS OF THE INVENTION

One object of the present invention is to provide a set of specific-shaped rails positioned on the upper side and front faces of bed between the bedliner and the plastic finishes of bed, capturing the water that eventually enters and preventing the water from invading an useful bed load area (120), improving the draining system.

One object of the present invention is to provide a water collection system allowing easy deployment and application in any model of monocoque vehicle with bed equipped with tonneau cover or similar.

One object of the present invention is to provide a system that effectively solves the water intake problem.

One object of the present invention is to provide a system that guarantees a better draining of water that enters through the tonneau cover and finishes preventing that water from reaching the useful bed load area (120) of vehicle.

One object of the present invention is to provide a system that allows directing the water that passes through the sealing of the side profile of tonneau cover and that which migrates from other parts of the body finishes out of the bed, creating an additional protection point and water draining.

SUMMARY OF THE INVENTION

Such features promote an improvement in the draining system and solve the problem of water intake into bed when compared with the prior art documents.

The invention features a water collection system for monocoque vehicles applied with tonneau cover or similar providing a front rail equipped with a flap that features cutouts enabling the rail to be attached to the bedliner.

The invention features a water collection system for monocoque vehicles applied with tonneau cover or similar providing a rail, when positioned, it is placed below the plastic finishes, allowing the water harvesting that passes through the junction between the bedliner and the front plastic finishes of the truck.

The invention features a water collection system for monocoque vehicles applied with tonneau cover or similar providing a front rail equipped at its ends with drain tubes attached to the bedliner for proper drainage out of bed.

The invention features a water collection system for monocoque vehicles applied with tonneau cover or similar providing side rails that have a flap that features cutouts fitted between the bedliner and side finishes.

The invention features a water collection system for monocoque vehicles applied with tonneau cover or similar providing rails equipped at one end with an outlet point that features a projection that allows fitting with the ends of the front rail, draining the water through the hole located in the lower portion of the projection and then drained out of bed through the ducts.

The invention features a water collection system for monocoque vehicles applied with tonneau cover or similar providing at the opposite end of the side rails a second outlet point draining the water through the gap between the tailgating and the vehicle bed.

The invention features a water collection system for monocoque vehicles applied with tonneau cover or similar providing a front rail that features slightly elongated ends for fitting side rails.

The invention features a water collection system for monocoque vehicles applied with a tonneau cover or similar providing side rails equipped with a light tilt from the higher portion, which drains water to inside the rail.

The invention features a water collection system for monocoque vehicles applied with tonneau cover or similar providing rails that allow adjustment and adaptation according to the type and shape of the target vehicle.

DETAILED DESCRIPTION OF THE INVENTION

Figure 1:
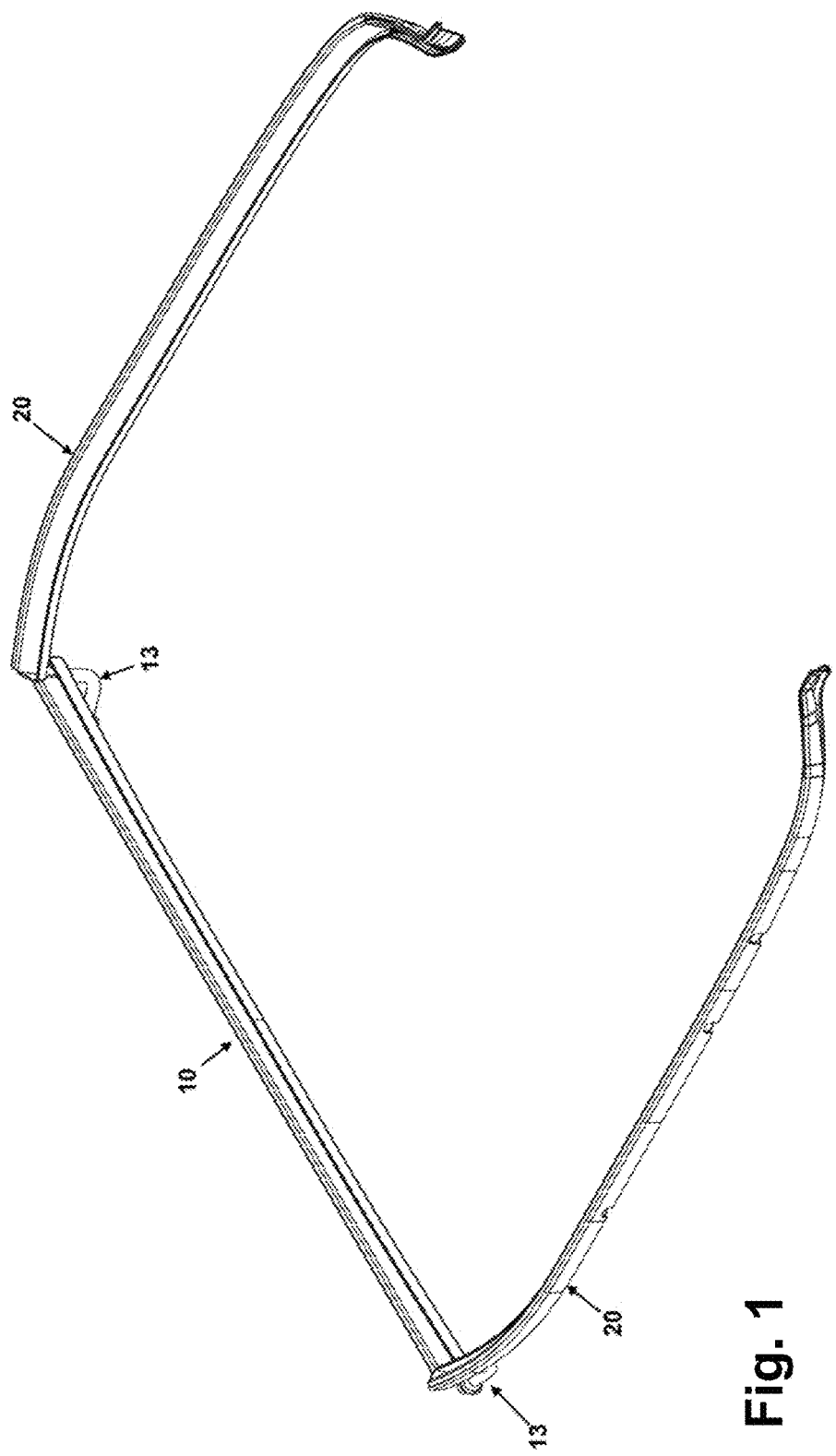
FIG. 1 shows the perspective view of the connected set of rails, detailing its fixation and fitting.
Figure 2:
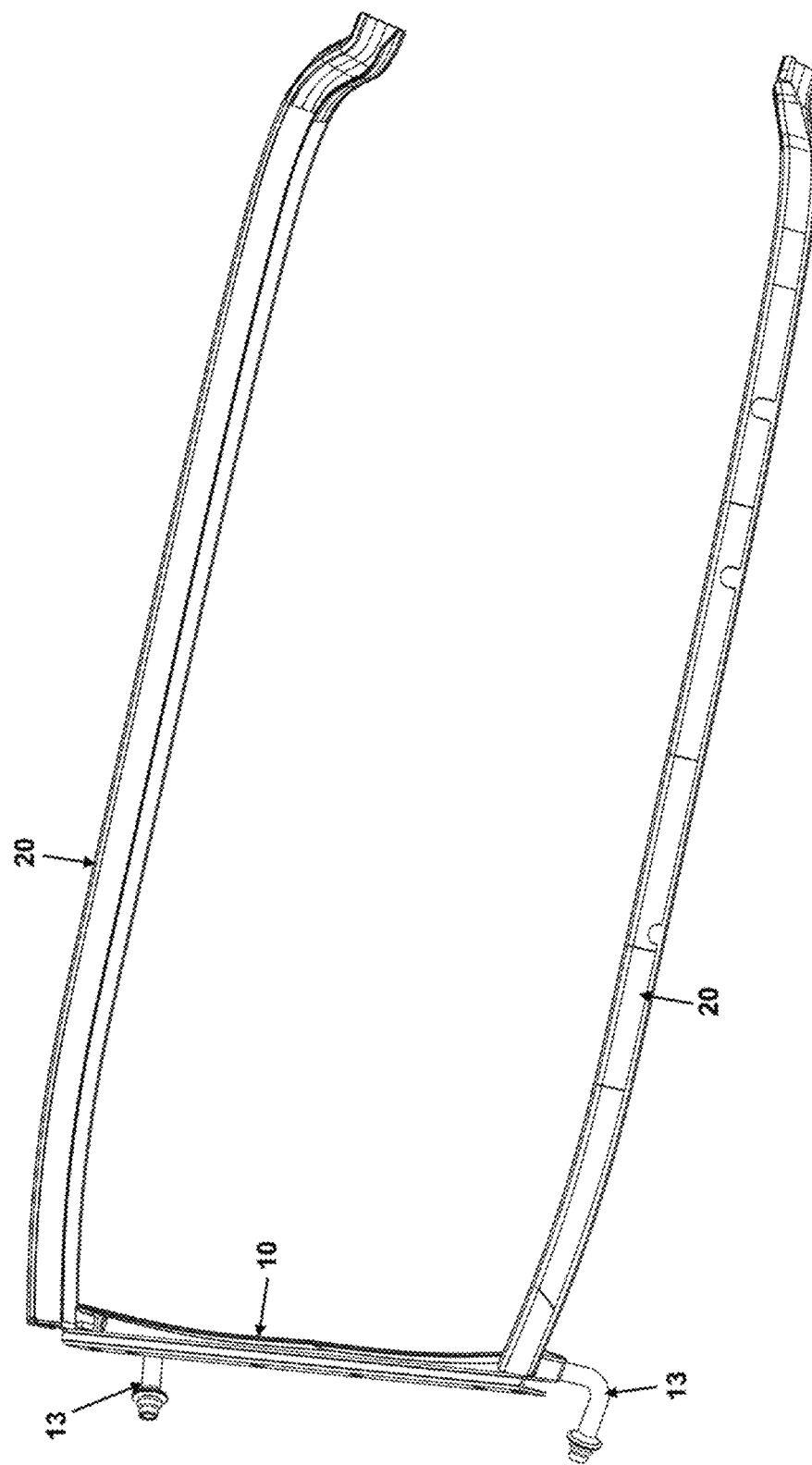
FIG. 2 shows the side perspective view of the connected set of rails, detailing its fixation and fitting.
Figure 3:
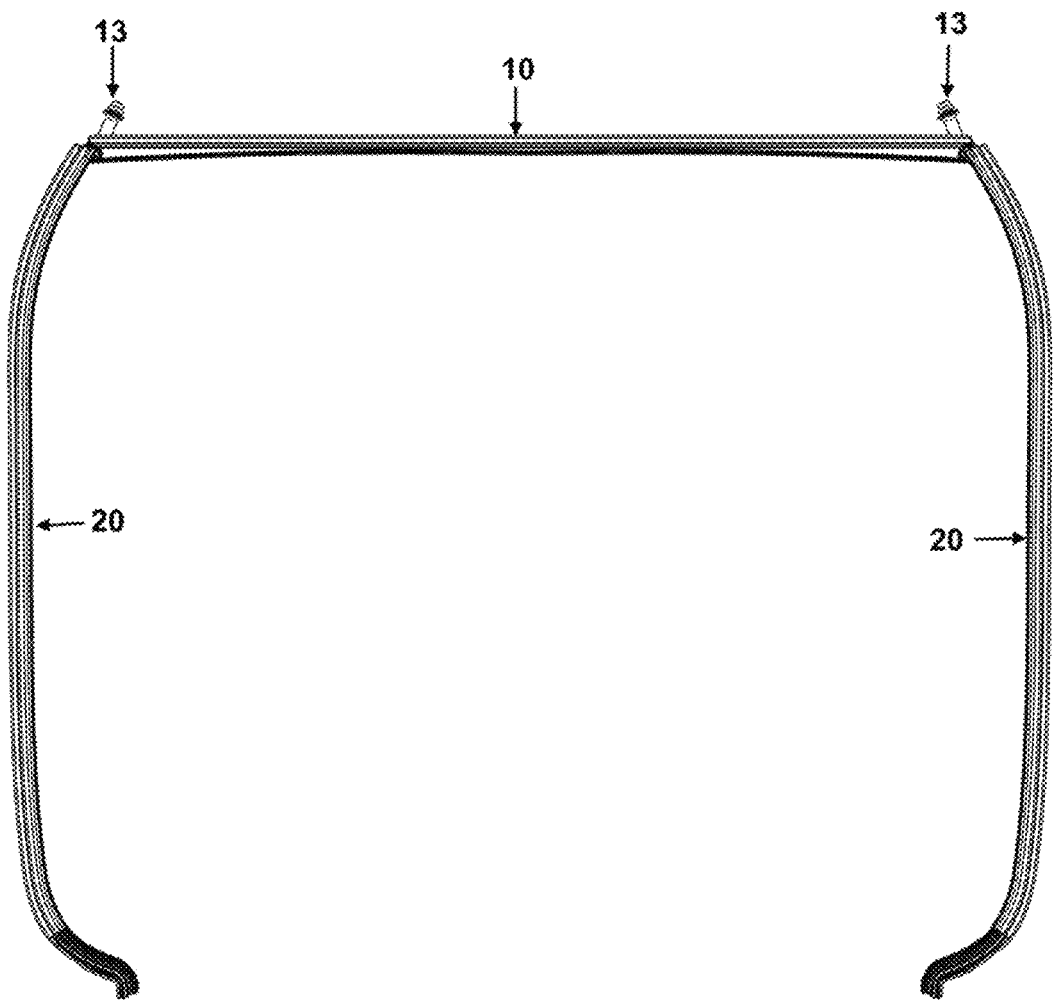
FIG. 3 shows the top view of the connected set of rails, detailing its fixation and fitting.
Figure 4:
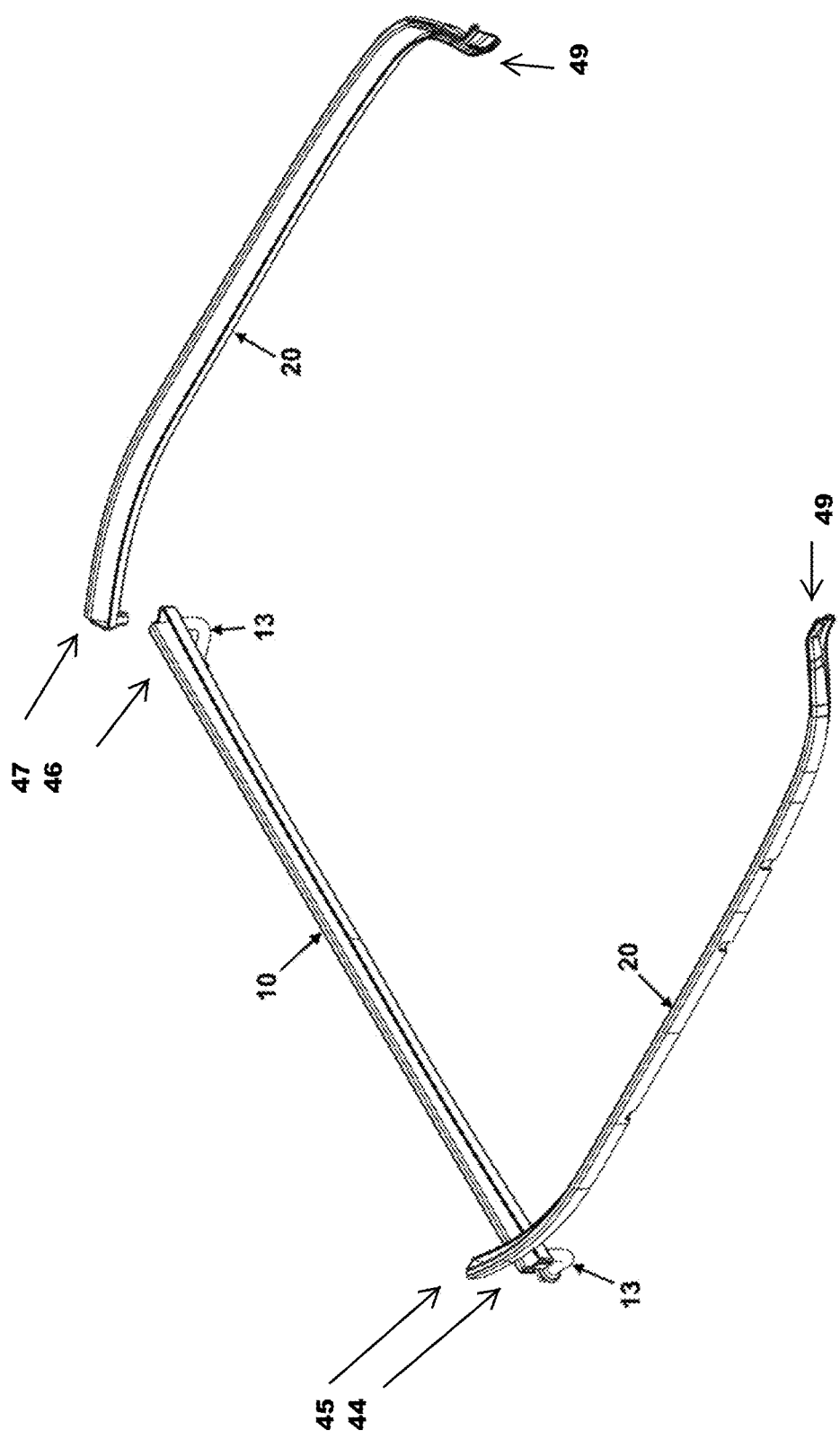
FIG. 4 shows the perspective view of the set of rails, detailing the fixation of the side rails with the front rail.
Figure 5:
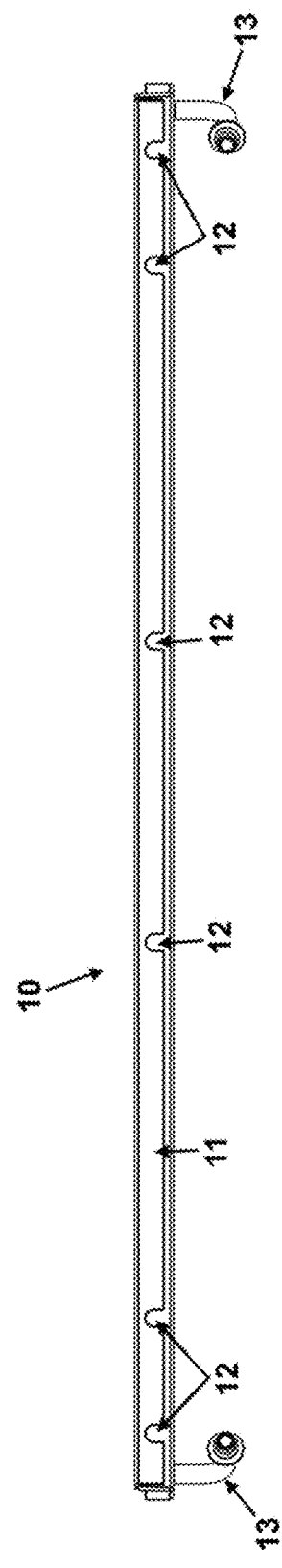
FIG. 5 shows the front view of the front rail, detailing its embodiment.
Figure 6:
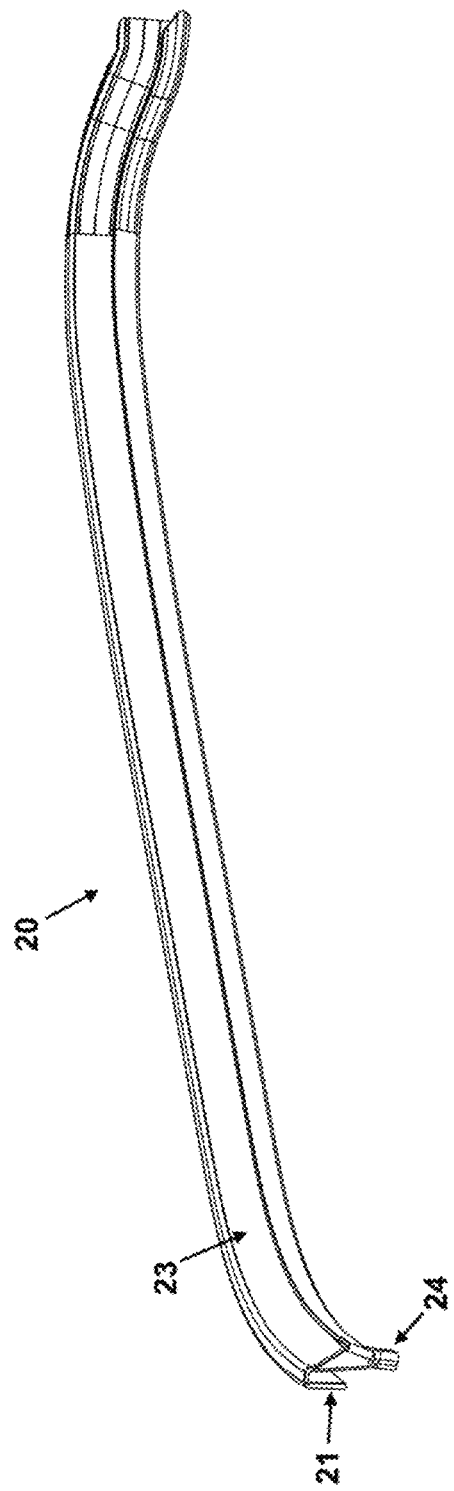
FIG. 6 shows the perspective view of the rail lateral, detailing its embodiment.
Figure 7:
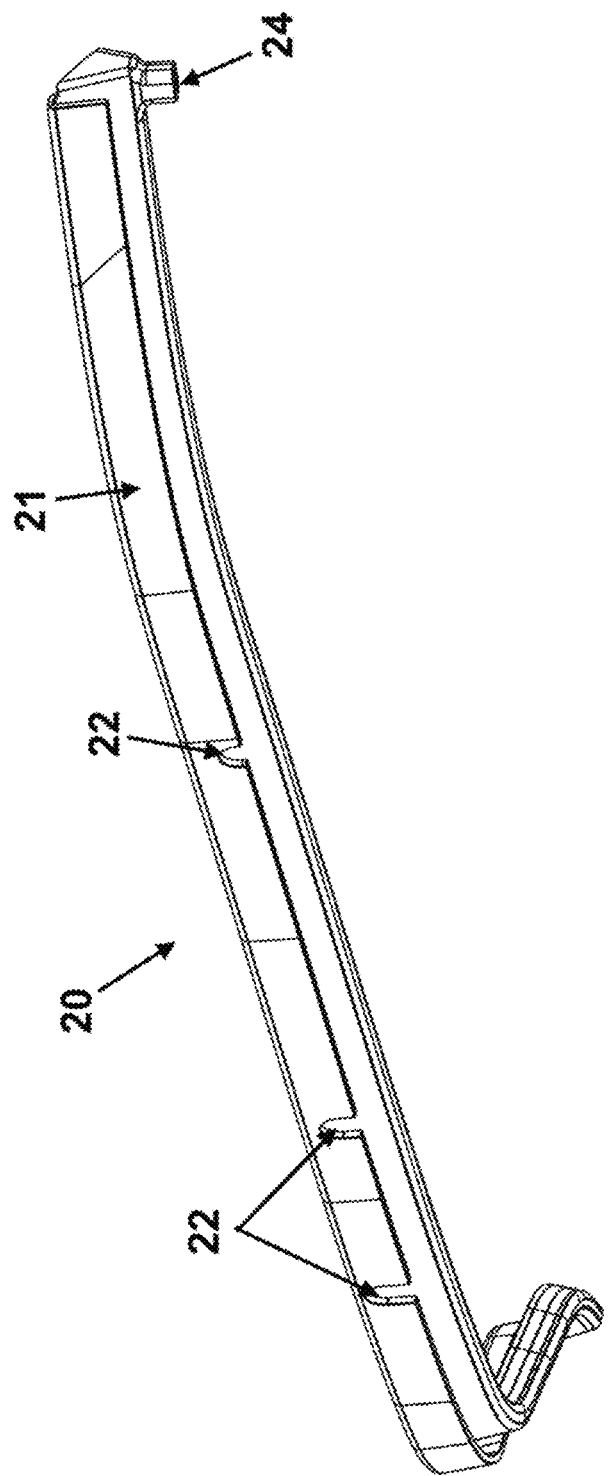
FIG. 7 shows the rear perspective view of the side rail, detailing its embodiment.
Figure 8:
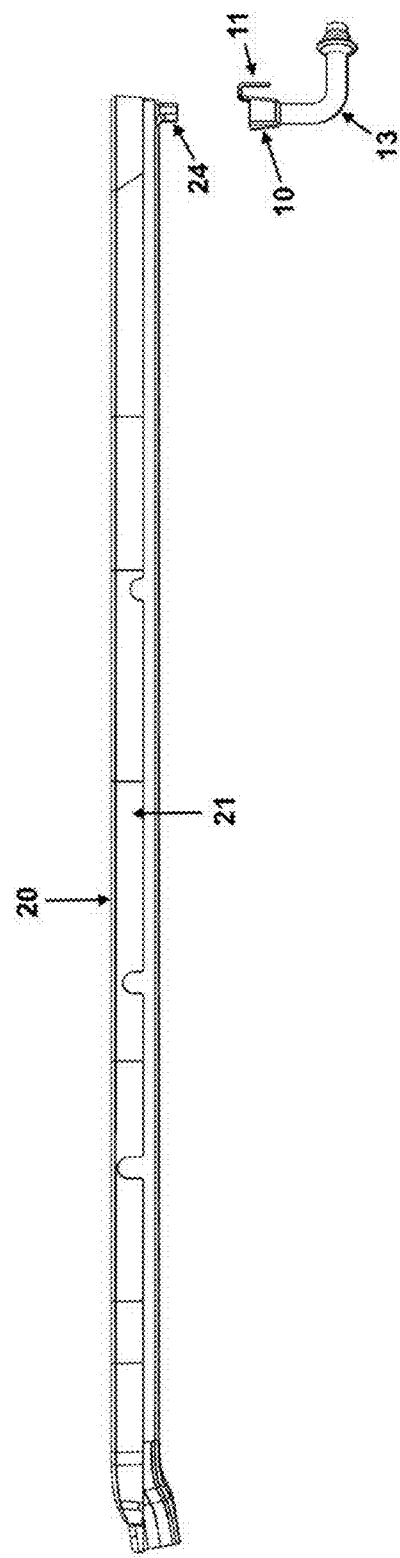
FIG. 8 shows the side view of the side rail and front rail.
Figure 9:
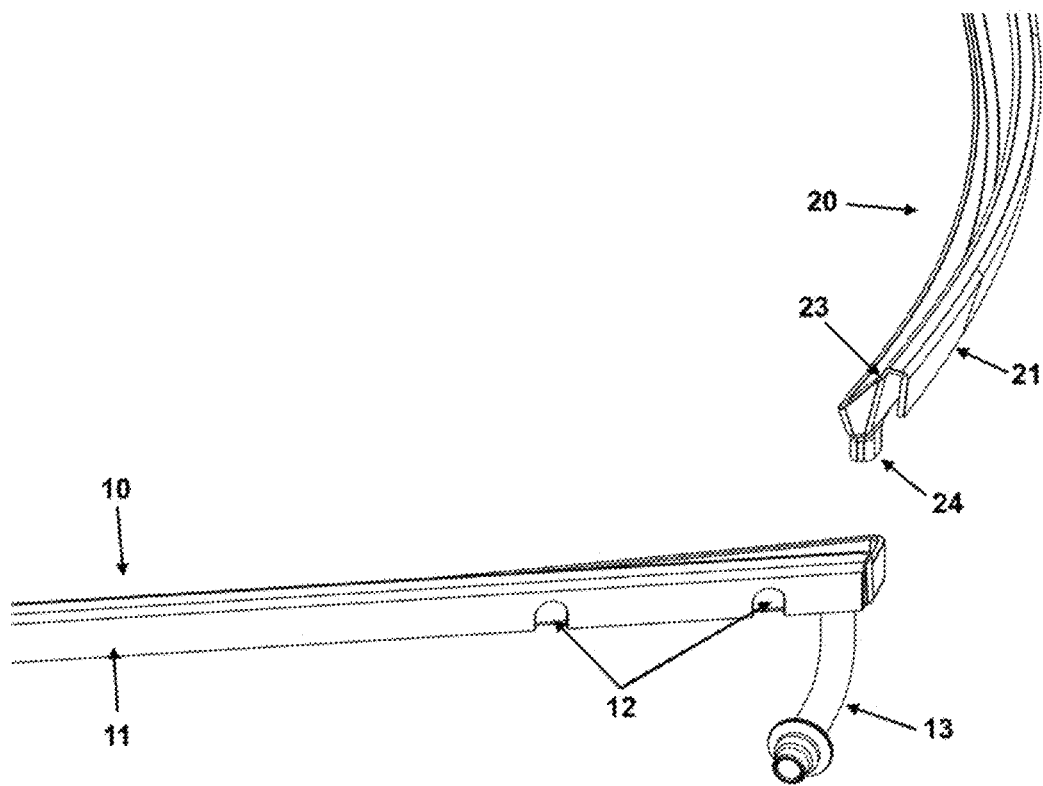
FIG. 9 shows the side view of the side rail and front rail, detailing the fitting way.
Figure 10:
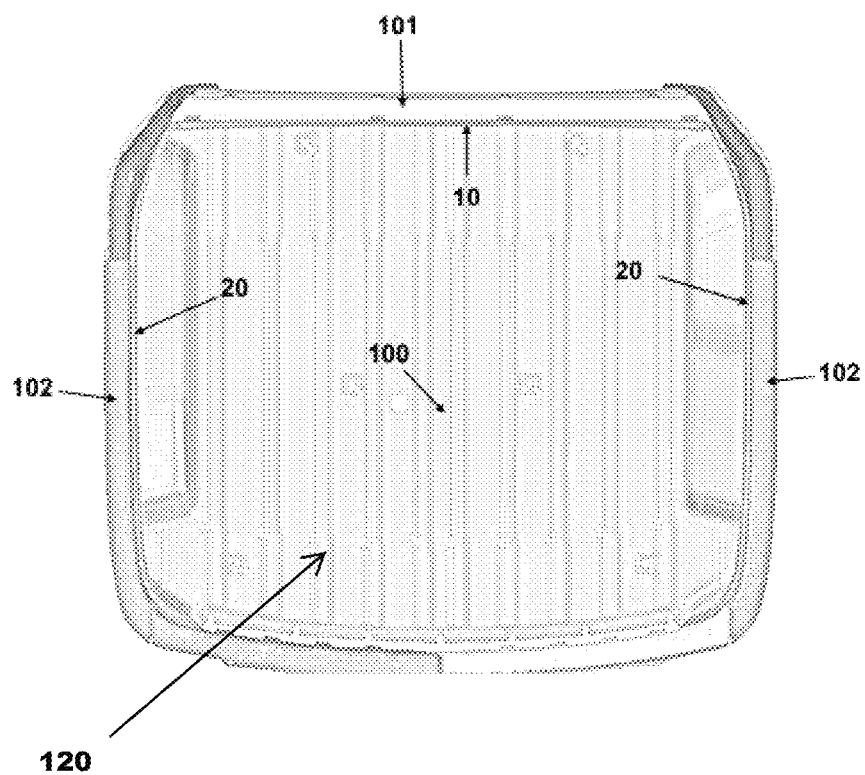
FIG. 10 shows the top view of vehicle bed, detailing the arrangement of side and front rails.
Figure 11:
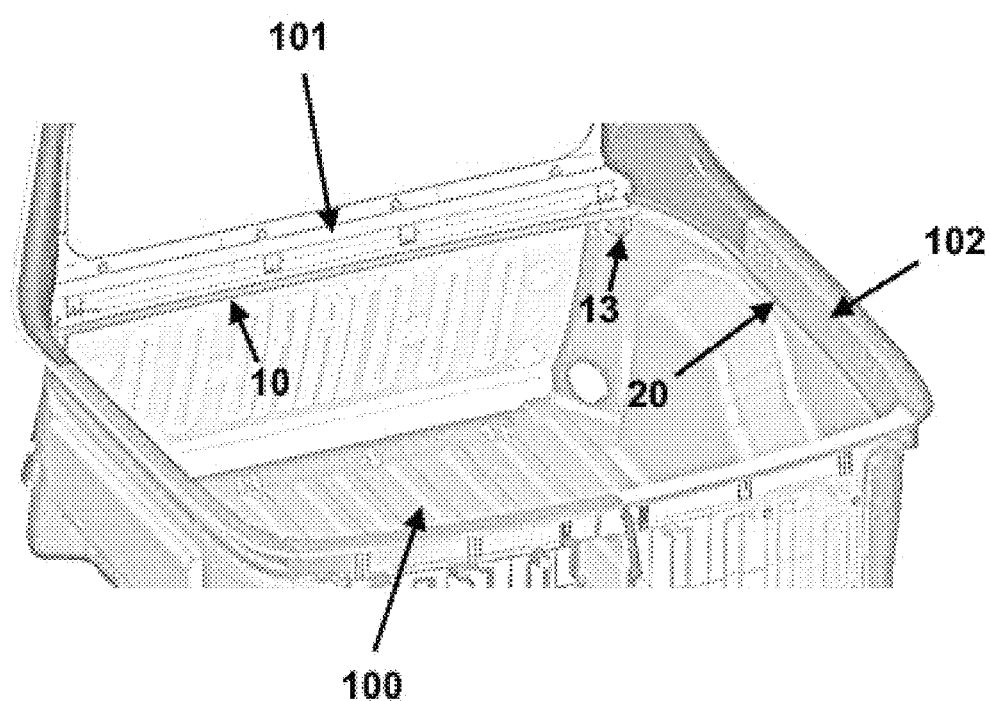
FIG. 11 shows the perspective view of vehicle bed, detailing the arrangement of the side and front rails.
Figure 12:
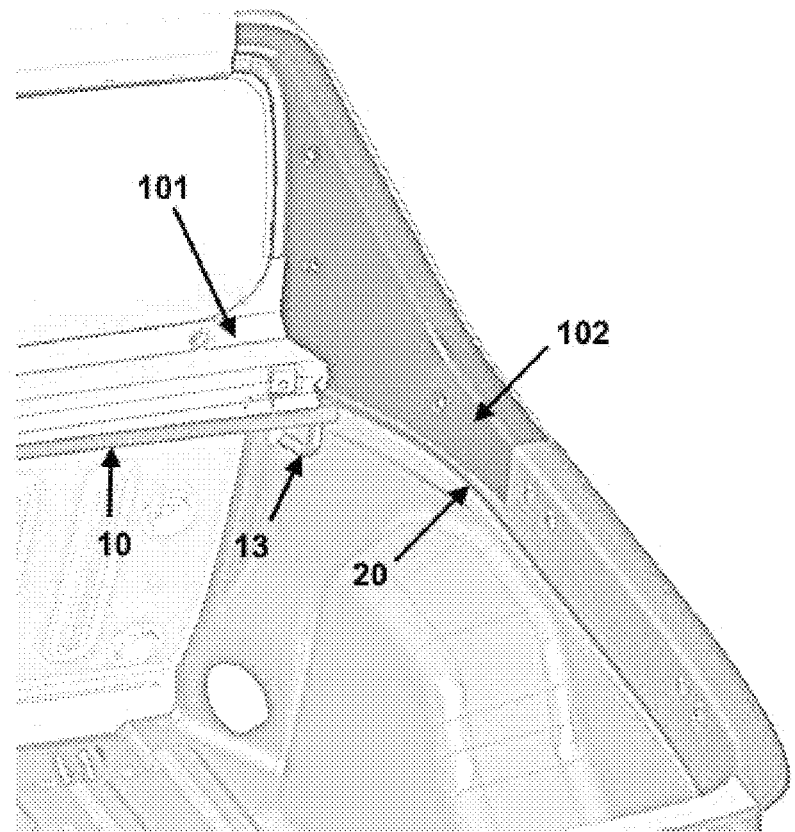
FIG. 12 shows the perspective view of vehicle bed, detailing the arrangement of front rail with the side rail fitted and the outlet point.
Figure 13:
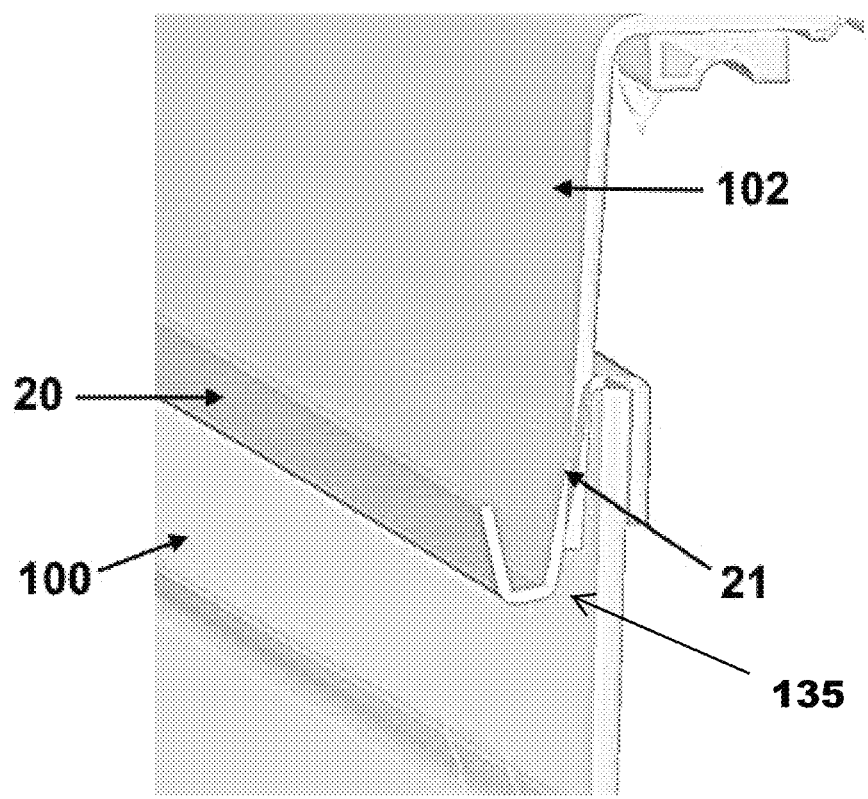
FIG. 13 show the perspective view of side rail fixing way with the chassis and bedliner.
Figure 14:
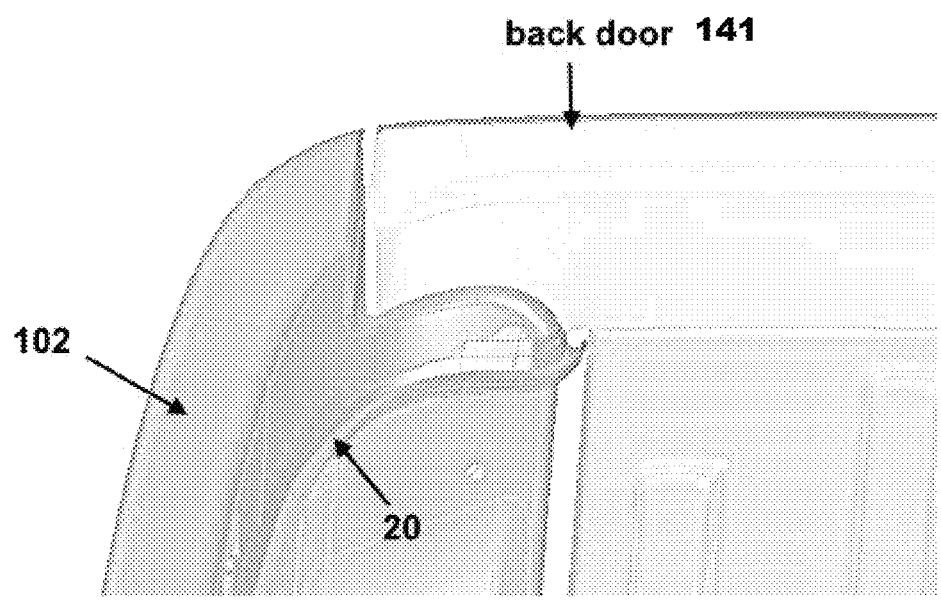
FIG. 14 shows the perspective view of the side rail with the vehicle bed, detailing the fixing point next to the tailgate (141).

The water collection and draining system for monocoque vehicles applied with tonneau cover or similar, object of the present invention, comprises a front rail (10) equipped with a flap (11) having cutouts (12) that allow the rail to be fixed (10) with the bedliner (100), so that the rail (10), when positioned, is arranged below the plastic finish (101), which allows water harvesting that passes through the junction between bedliner and the pickup front finish.

The water collection and draining system for monocoque vehicles applied with tonneau cover or similar, object of the present invention, comprises a front rail (10) equipped with a flap (11) having cutouts (12) that allow the rail to be fixed (10) with the bedliner (100), so that the rail (10), when positioned, is arranged below the plastic finish (101), which allows water harvesting that passes through the junction between bedliner and the pickup front finish.

The front rail (10) is equipped at its ends (44) and (46) with drain tubes (13) allowing the water received on the rail (10) to be directed out of bed, said tubes (13) being fixed with the bedliner (100) for the due draining.

The rail (10) has a specific shape with slightly elongated ends for fitting side rails (20).

The side rails (20) have a flap (21) with cutouts (22) making it possible to fit with the top flap of the bedliner (100) and side finishes (102), so that the rails (20), when positioned on the upper side edges of the bedliner are positioned between the bedliner (100) and the side plastic finishes (102).

The rails (20) are equipped with a light tilt (23) from the higher portion facilitating the water draining to inside of rail (20).

Figure 15:
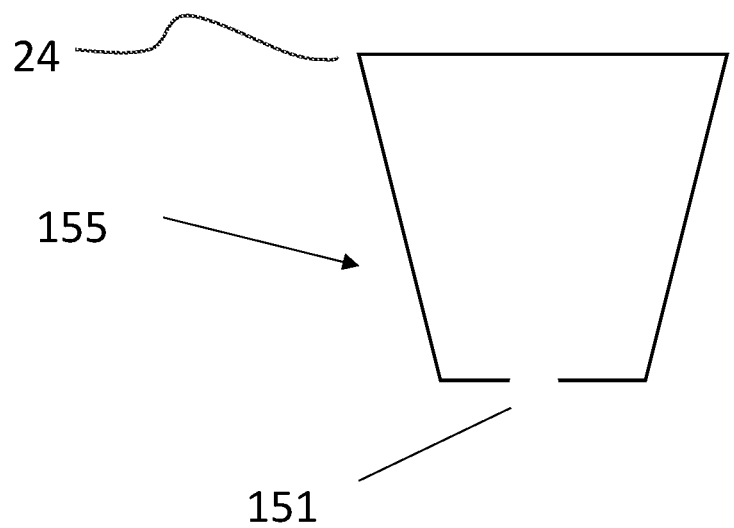
FIG. 15 shows, on outlet point (24), a lower portion (155) of hole (151).

The rail (20) is equipped at one of its ends (45) or (47) with an outlet point (24) provided with a projection allowing it to fit with the end (44) or (46) of the front rail (10), so that the water from the side rails is drained to the front rail (10) through the hole (151) located in the lower portion (155) of the projection (24) and then drained out of bed through the ducts (13). FIG. 15 shows, on outlet point (24), a lower portion (155) of hole (151).

At the opposite end (49), the rails (20) are equipped with a second outlet point (135), allowing part of the water not drained to the rails (20) to be directed out of the bed, being drained through the gap between the tailgate (141) and the vehicle bed.

The rails (20) are provided with a specific shape following the bed shape, and it can be adjusted and adapted according to the type and shape of the target vehicle.

The rails (20) allow to direct the water passing through the seal of the side profile of tonneau cover and migrating from other parts of the body finishes out of bed, creating an additional point of protection and water drainage.

Figure 16:
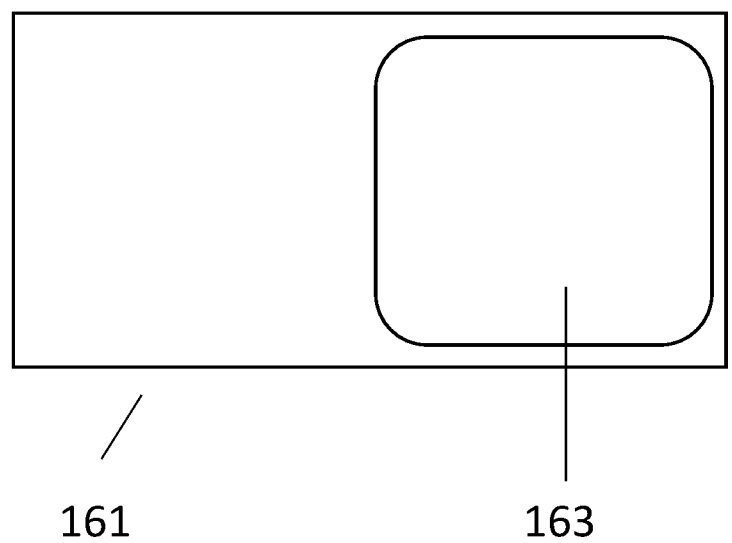
FIG. 16 shows an embodiment of a vehicle (141) and its monocoque bed (161).

FIG. 16 shows an embodiment of a vehicle (141) and its monocoque bed (161).

The invention claimed is:

1. A water collection system for a vehicle (161) having a monocoque bed (163) and an attached tonneau cover, comprising:
a front rail (10) equipped with a flap (11) having cutouts (12) configured to fit the front rail (10) together with a bedliner (100) having a plastic finish (101) in the region where the front rail (10) is fitted to the bedliner (100)

so that the front rail (10), when positioned, is arranged below the plastic finish (101), the front rail (10) being equipped in its ends (44) and (46) with drain tubes (13) which are fitted with the bedliner (100) for draining a useful bed load area (120);

two side rails (20), each has a flap (21), each has cutouts (22), and each is configured to be fitted between the bedliner (100) and a respective side finish of a vehicle (102), each of the two side rails (20) is equipped in one of its ends (44) or (46) with an outlet point (24) projecting to fit with the-end (45) or (47) of front rail (10) for draining water through a hole (151) located in the lower portion (155) of the outlet point (24) and draining water through drain tubes (13); in the opposite end the rails (20) are equipped with a second outlet point (135) for draining water.

2. The water collection system according to claim 1, wherein the front rail (10) has slightly configured ends for fitting each of the two side rails (20).

3. The water collection system according to claim 1, wherein each of the two side rails (20) is equipped with a slight tilt (23) from a higher portion for draining water inside the respective side rail (20).

4. The water collection system according to claim 1, wherein the front rail (10) and each of the two side rails (20) are shaped to follow the bedliner (100).

5. The water collection system according to claim 1, wherein the front rail (10) and each of the two side rails (20) enable the adjustment and adaptation to a type and a shape of the vehicle's (161)'s monocoque bed (163).

* * * * *